United States Patent [19]
Nakai et al.

[11] Patent Number: 5,954,803
[45] Date of Patent: Sep. 21, 1999

[54] DMA CONTROLLER WHICH PROVIDES MULTIPLE CHANNELS

[75] Inventors: Yoshiyuki Nakai; Seiji Kawaji, both of Nara, Japan

[73] Assignee: Sharp Kabushiki Kaisha, Osaka, Japan

[21] Appl. No.: 08/818,077

[22] Filed: Mar. 14, 1997

[30] Foreign Application Priority Data

Mar. 21, 1996 [JP] Japan ..................... 8-065015

[51] Int. Cl.⁶ ..................................... G06F 13/14
[52] U.S. Cl. ............................ 710/28; 711/151; 711/154
[58] Field of Search ........................... 395/848; 711/151, 711/154, 159; 710/28

[56] References Cited

U.S. PATENT DOCUMENTS

| | | | |
|---|---|---|---|
| 4,157,587 | 6/1979 | Joyce ....................................... | 364/200 |
| 5,016,165 | 5/1991 | Tanikawa et al. ....................... | 364/200 |
| 5,034,886 | 7/1991 | Yamamura .............................. | 364/200 |
| 5,317,711 | 5/1994 | Bourekas et al. ....................... | 395/425 |
| 5,363,486 | 11/1994 | Olson et al. ............................ | 395/250 |
| 5,392,391 | 2/1995 | Caulk, Jr. et al. ...................... | 395/162 |
| 5,469,558 | 11/1995 | Lieberman .............................. | 395/285 |
| 5,553,268 | 9/1996 | Willenz et al. ......................... | 395/485 |
| 5,652,915 | 7/1997 | Jeter et al. .............................. | 395/872 |

FOREIGN PATENT DOCUMENTS 0340972 11/1989 European Pat. Off. .

OTHER PUBLICATIONS

Tokukouhei, Japanese Laid–Open Patent Publication No. 5–250306, Sep. 1993.
V.G. Barbutov, "DMA Controller" UK Patent Application, Publication No. GB–A–2211325, Published Jun. 28, 1989.
S.D. Bayle, "Structure for Enabling Direct Memory–to–Memory Transfer", European Patent Application, Publication No. EP–A–0464848, Published on Jan. 8, 1992.
S.H. Leibson, "Adding DMA to Other Functions Boosts Speed", EDN Electrical Design News, vol. 34, No. 22, Oct. 26, 1989).
T. Masakatsu, "Circuit System for DMA Device", Japanese Laid–Open Patent Publication No. 4–111149, Laid Open Apr. 13, 1992.
A. Akihiro, "DMA Controller", Japanese Laid–Open Patent Publication No. 5–250306, Laid Open on Sep. 28, 1993.

*Primary Examiner*—Thomas C. Lee
*Assistant Examiner*—Albert Wang
*Attorney, Agent, or Firm*—Dike, Bronstein, Roberts & Cushman, LLP; David G. Conlin

[57] ABSTRACT

In a DMA controller in accordance with the present invention, in the case of memory-to-memory data transfer using the DMA process (transfer for changing addresses inside the memory), one channel for carrying out the data transfer is provided. In the case of data transfer between the I/O device and a memory using the DMA process, two channels for carrying out the data transfer are, on the other hand, provided by using a circuit that constitutes said one channel. Thus, it is possible to provide multiple channels in the DMA controller by using a compact, inexpensive circuit construction.

21 Claims, 9 Drawing Sheets

DMA CONTROLLER WHICH PROVIDES MULTIPLE CHANNELS

FIELD OF THE INVENTION

The present invention relates to a DMA (Direct Memory Access) controller which is installed in a data processing apparatus for processing image data with a large capacity using a CPU (Central Processing Unit) as its central unit, such as a digital copying machine, a facsimile, or a multi-function apparatus having composite functions, and which controls data transfer that is carried out without using the CPU through an independent data transfer path that is different from the data transfer path between various peripheral I/O devices and the memory using the CPU.

BACKGROUND OF THE INVENTION

Conventionally, facsimiles and digital copying machines have been known as data processing systems each of which is constituted by a CPU, a memory, I/O devices and a DMA controller. FIG. 9 is a block diagram showing the construction of a digital copying machine.

The digital copying machine in FIG. 9 is constituted by a scanner section having a CCD (Charge Coupled Device) 201 and an analog-signal processing section 202, a digital multi-value image processing section 203, a multi-value/binary conversion section 204, a binary/multi-value conversion section 205, a CPU 206, a memory 207, and a printer section having a laser control section 208 and a laser scan unit 209.

In the above-mentioned construction, an original document is irradiated by a light source (not shown), and the reflected light is converted into an electric signal by the CCD 201. The weak electric signal is amplified, compensated for, and converted into a digital signal, that is, image data, by the analog-signal processing section 202. The image data is subjected to an image process such as an edge-emphasizing process by the digital multi-value image processing section 203 so as to enhance the image quality. In the multi-value/binary conversion section 204, the multi-value image is converted into a binary image by using a method such as an error dispersion method that is one of the methods for representing half tone with binary digits, in order to decrease the amount of data. The binary coded data is temporarily stored in the memory 207. Further, the binary coded data, read from the memory 207, is multi-value coded by the binary/multi-value conversion section 205. The laser control section 208 carries out a gradation process on the laser by means of a pulse-width modulation based upon the image data. The laser scan unit 209, which has a polygon motor (not shown) and a semiconductor laser (not shown), projects a laser beam onto a charged photoconductor (not shown) so that a latent image is formed on the photoconductor. The CPU 206, in its CPU section, carries out various processes, such as setting registers in the various I/O devices, carrying out editing processes of the image data stored in the memory, such as a shading process for providing shadows diagonally to the lower right of characters, or overlaying distribution data of character data onto the image data.

In the above-mentioned digital copying machine, high-speed operations are required with respect to transfer operations, such as the transfer of the image data released from the multi-value/binary conversion section 204 to the memory 207 or the transfer of the image date stored in the memory 27 to the binary/multi-value conversion section 205. Accordingly, these transfers are often carried out directly without using the CPU 206. Moreover, in the case when processes, such as a rotation process for rotating an image by 90 degrees, are carried out on the image data, the internal transfer of the image data from the memory 207 to the memory 207 is often carried out directly without using the CPU 206. A DMA controller 210 controls such data transfers.

The conventional DMA controller 210 used in a digital copying machine has a construction shown in FIG. 10. In FIG. 10, the DMA controller 210 is provided with input terminals 221 and 223 for data-transfer request signals that respectively correspond to channels CH0 and CH1 and output terminals 222 and 224 for data-transfer response signals that respectively correspond to the channels CH0 and CH1. The transferred data is inputted and outputted in synchronism with the data-transfer response signals.

Here, in FIG. 10, the channel CH0 is connected to the output section of the multi-value/binary conversion section 204, that is an output-image buffer, which functions as an I/O device. The channel CH1 is connected to the input section of the binary/multi-value conversion section 205 that functions as an I/O device, that is, to an input-image buffer. Further, a channel CH2 and a channel CH3 are connected to a DRAM controller 211. The DRAM controller 211 is alternatively installed either in the CPU 206 or in the DMA controller 210, or placed independently; therefore, it is not shown in FIG. 9.

The DMA controller 210 is further provided with selectors 227 and 228 and counters 229 through 236.

The selector 227, upon receipt of a plurality of data-transfer request signals at the same time, makes a selection as to which data-transfer request signal should be taken first based upon a predetermined order of preference. Further, the selector 227, upon receipt of a data-transfer request signal with a higher order of preference during a transfer operation of data with a lower order of preference, carries out a reconciliation so as to transfer data in accordance with the order of preference.

The counters 229 through 232, which are installed for the corresponding channels CH0 through CH3, are counters used for creating addresses for the memory 207. These counters, 229 through 232, add and subtract addresses each time data is transferred. The addresses created in the counters 229 through 232 are selected by the selector 228, and sent to the DRAM controller 211.

The DRAM controller 211 converts the given addresses into a column address and a row address, and releases them to the memory 207 together with various control signals (*RAS, *CAS, etc.).

The counters 233 through 236, which are installed for the corresponding channels CH0 through CH3, are counters used for calculating the number of words of transferred data.

As described above, the conventional DMA controller 210 requires two counters for each channel, that is, the counter used for addresses and the counter used for calculating the number of words of transferred data. For this reason, the more the number of channels, the larger the circuit size becomes, resulting in high costs. This problem is particularly aggravated in apparatuses which have a large circuit size with a number of I/O devices.

In order to solve this problem, Japanese Laid-Open Patent Publication 250306/1991 (Tokukaihei 5-250306) discloses a DMA controller. In this DMA controller, registers are provided in place of the counters provided in the above-mentioned DMA controller 210, and a computing element, which is commonly used in all the channels, is provided so that addition of addresses and calculation of the number of words of transferred data are carried out by the computing element. Since registers require fewer gates than counters, this arrangement makes it possible to reduce the circuit size. Therefore, the application of such a DMA controller to a facsimile in the above-mentioned Laid-Open Patent Publication seems to reduce costs.

However, in the DMA controller disclosed in the above-mentioned Laid-Open Patent Publication, no consideration is given to a construction wherein the data transfer is carried out between the memories as well as between the memory and the I/O devices by using circuits with a small size, that is, a construction wherein multiple channels are achieved by using circuits with a small size.

Moreover, in recent years, multi-function apparatuses, which are composite apparatuses including facsimiles, digital copying machines, printers, etc., have been developed. In such multi-function apparatuses, high resolution has been achieved and the amount of data to be processed has been increased. Therefore, the multi-function apparatus tends to reduce the amount of memory so as to cut costs by eliminating a memory corresponding to one page that has been provided for each mode so that the memory can be commonly used.

In this case, a great many channels are required and when, upon receipt of a request for data transfer, the data cannot be transferred, lack of image might occur. Therefore, it is necessary for the multi-function apparatus to have a reconciling process that can deal with complex data-transfer requests.

However, in the DMA controllers of the above-mentioned Laid-Open Patent Publications, in the case when a plurality of requests for data transfer are made at the same time, even though it is possible to carry out a simple reconciling process for data-transfer requests, such as a data transfer based upon the predetermined order of preference, it is difficult to carry out a reconciling process for further complex data-transfer requests.

Moreover, even though a register requires fewer gates as compared with a counter, the difference is comparatively small. Therefore, the addition of a conciliation circuit for the reconciling process for complex data-transfer requests might rather increase the size of circuit.

Furthermore, although the DMA controllers of the above-mentioned Laid-Open Patent Publications are suitable for providing an optimal circuit for each specific system, it is difficult for them to maximize their hardware. In other words, since the computing element is commonly used in the respective channels, it is not possible to achieve maximization only by simply increasing the number of DMA macros.

In particular, it is not possible to carry out a memory-to-memory DMA process or to carry out a DMA process from a memory to an I/O device inside the same arrangement. Another problem is that since the transfer speed of image data has to be increased as the resolution increases, when the CPU changes the settings of the registers in accordance with a change in mode, the overhead time tends to increase in order to satisfy the settings.

Moreover, in the conventional DMA controllers, in the case when a data-transfer request is made from an I/O device during a memory-to-memory data transfer, the data-transfer of the I/O device is carried out after completion of the memory-to-memory data transfer; therefore, it is difficult to carry out another process by using the same arrangement. This is because very complicated software is required since the memory-to-memory data transfer and the data transfer from the I/O device to the memory are asynchronously operated.

Moreover, since the RISC (Reduced Instruction Set Computer) processor in the CPU carries out high-speed operations by pipeline-processing simple instructions at high speeds, the cycle time of the execution of instructions is faster than the access time of memories. For this reason, the RISC processor has a data cache and an instruction cache, and data and instructions from the external memory are loaded in the caches. Caches refer to special memories which are installed inside a CPU and to which the CPU makes a high-speed access. The CPU executes data and instructions inside the cache; however, the data and instructions to be executed are occasionally not available in the cache. This is referred to as a "miss-hit". In such a case, data and instructions located around addresses of a memory in which the necessary data and instructions have been stored are loaded to the cache. This operation is referred to as "refill". Since the necessary data and instructions are likely to exist at adjacent addresses, the greater the size of refill, the smaller the probability of miss-hit, resulting in a better performance of the CPU.

However, in the case when a data-transfer request is made during a refilling process, the operation can not be shifted until the refilling process has been completed. The data transfer is requested by the binary/multi-value conversion section 205 so as to print out data. In this case, loss of data might occur in a page printer such as a laser printer, unless the data is continuously sent thereto. This situation needs to be avoided by all means.

In systems using the conventional DMA controllers, in order to avoid loss of data even in the case when the shift is made after completion of the refilling process, the size of a data buffer in the I/O device such as a multi-value/binary conversion section 204 is increased, or the size of refill is decreased. In this case, the increased size of the data buffer causes the size of circuit to become bulky, and the decreased size of refill causes low performance of the CPU.

SUMMARY OF THE INVENTION

The objective of the present invention is to provide a DMA controller which achieves multiple channels by using a small, inexpensive circuit construction.

In order to achieve the above-mentioned objective, the DMA controller of the present invention is provided with: a first register for storing a starting address of data transfer-destination ; a second register for storing a starting address of data transfer-origin; a third register for storing the number of words of the data to be transferred; a fourth register for storing information to determine whether the data transfer-destination is an I/O device or a memory; a fifth register for storing information to determine whether the data transfer-origin is an I/O device or a memory; a sixth register for storing the number of words to be transferred with respect to one transfer request in the case of data transfer between an I/O device and a memory; and an operation section which calculates addresses stored in the first and second registers and the number of remaining words of transferred data stored in the third register based on the information stored in the first register, second register, third register and sixth register, in response to a data transfer operation using a DMA process, so as to update the addresses and remaining words. In this arrangement, in the case of memory-to-memory data transfer using the DMA process based upon the information stored in the fourth and fifth registers, one channel for carrying out the data transfer is provided, and in the case of data transfer between the I/O device and a memory using the DMA process, two channels for carrying out the data transfer are provided by using a circuit that constitutes said one channel.

In the above-mentioned DMA controller, in the case of data transfer using the DMA process, it is confirmed whether the data transfer-destination and the data transfer-origin are the I/O device or memories based on the information stored in the fourth and fifth registers.

For example, in the case when the data transfer-origin is an I/O device and the data transfer-destination is a memory, in response to a data-transfer request from the I/O device, data corresponding to the number of words to be transferred, stored in the sixth register, is transferred from the I/O device to the memory. In accordance with this operation, the operation section carries out calculations based on the information stored in the first register, second register, third register and sixth register, and based on the results of the calculations, updates addresses stored in the first and second registers and the number of remaining words of transferred data stored in the third register.

In other words, the address values of the first and second registers are those equivalent to the previously stored values added by the number of words transferred which has been stored in the sixth register. Further, the number of remaining words of the transferred data in the third register is the value equivalent to the previously stored value subtracted by the number of words transferred. In the case of data transfer from another memory to the I/O device or memory-to-memory data transfer, the operations are carried out in the same manner.

In the present DMA controller, in the case of memory-to-memory data transfer using the DMA process, one channel for carrying out the data transfer is provided, and in the case of data transfer between the I/O device and a memory using the DMA process, two channels for carrying out the data transfer are provided by using a circuit that constitutes said one channel.

Therefore, it is possible to provide multiple channels at low costs without the need for a big circuit construction.

In a preferable example of the present invention, the DMA controller is further provided with a storage section for storing the order of preference with respect to a plurality of data-transfer operations using the DMA process, and a reconciliation section for reconciliating the data-transfer operations based on the order of preference stored in the storage section. When, during a data-transfer operation using the DMA process, it receives a data-transfer request having a higher order of preference than the current data transfer, the reconciliation section suspends the on-going data-transfer operation, allows the operation section to update the stored information of the first register, the second register and the third register based on the number of transferred words up to the time of the suspension so that the suspended operation can become resumable, carries out the data-transfer operation having the higher order of preference, and resumes the previously suspended data-transfer operation upon completion of said data-transfer operation.

Upon receipt of a plurality of data-transfer requests, th e above-mentioned DMA controller carries out the data transfer operations in accordance with the predetermined order of preference. Therefore, it is possible to readily carry out reconciliation processes with respect to the multiple data-transfer requests in accordance with the order of preference by using a simple construction. In other words, even when, during a transfer operation for data having a relatively low order of preference, a request for data-transfer for data having a higher order of preference is made, the corresponding data-transfer is readily carried out by using a simple construction without the need for a big circuit construction.

In another preferable example of the present invention, a cache controller, which refills a cache, is connected to the DMA controller, and a refill-size control section, which upon carrying out a data-transfer operation using the DMA process, makes the refill-size of the refill of the cache smaller than the size that has not been subjected to the data-transfer operation, is also provided therein.

In the above-mentioned DMA controller, when a data-transfer operation using the DMA process is carried out, the refill-size of the refill of the cache is made smaller than the size that has not been subjected to the data-transfer operation; therefore, it is possible to readily complete processes related to the refill. Consequently, it becomes possible to prevent malfunctions in transfer, such as loss of transfer data, without the need for, for example, a big buffer in the I/O device. Further, when the data-transfer operation using the DMA process is not carried out, the refill size can be returned to the normal setting.

Thus, the reconciliation process, which properly maintains both the performance of the refill of the cache and the performance of the data-transfer, can be achieved by using a simple construction.

For a fuller understanding of the nature and advantages of the invention, reference should be made to the ensuing detailed description taken in conjunction with the accompanying drawings.

DESCRIPTION OF THE EMBODIMENT

Embodiment 1

The following description will discuss one embodiment of the present invention.

Figure 2:
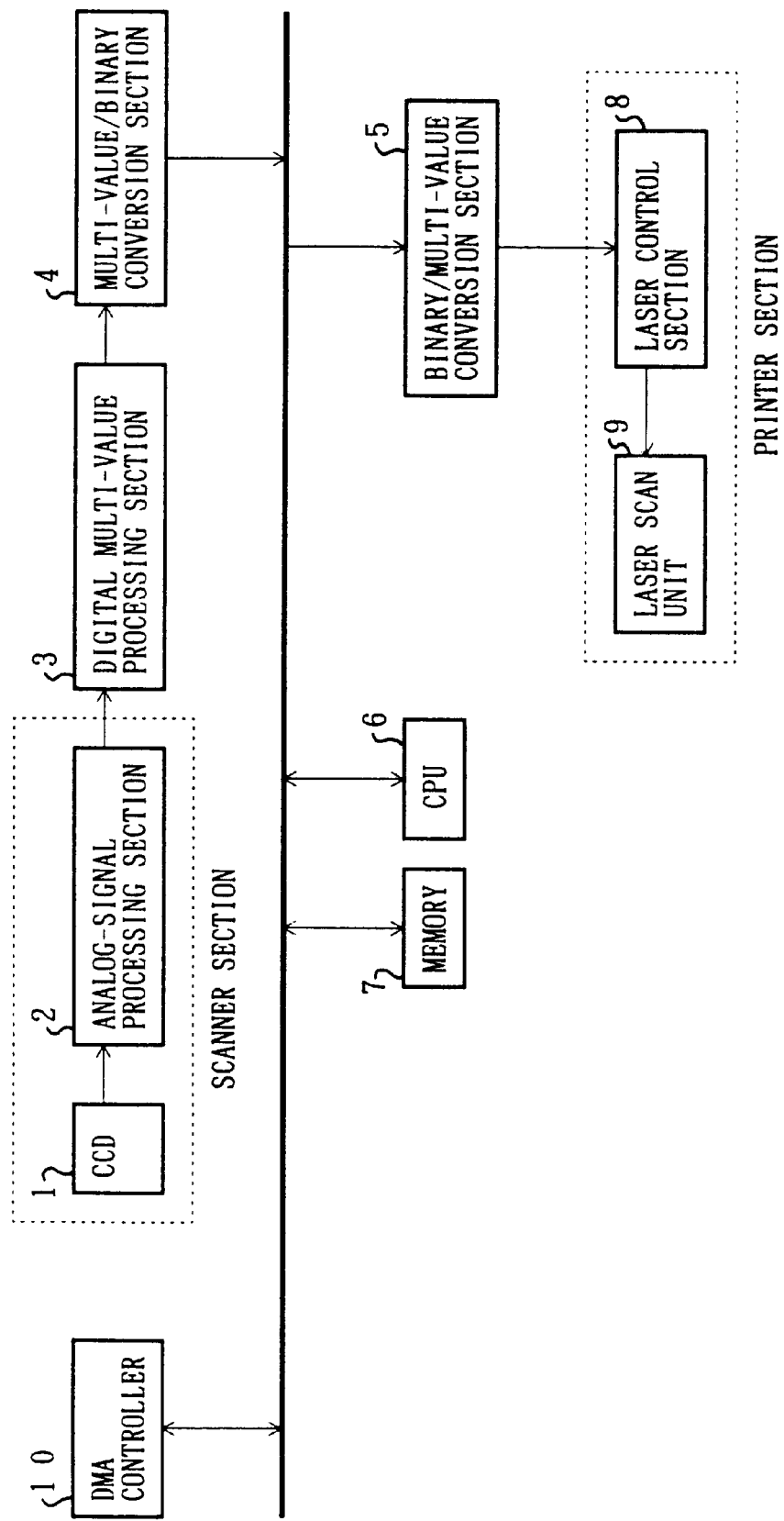
FIG. 2 is a block diagram showing a digital copying machine in which the DMA controller is installed.
Figure 9:
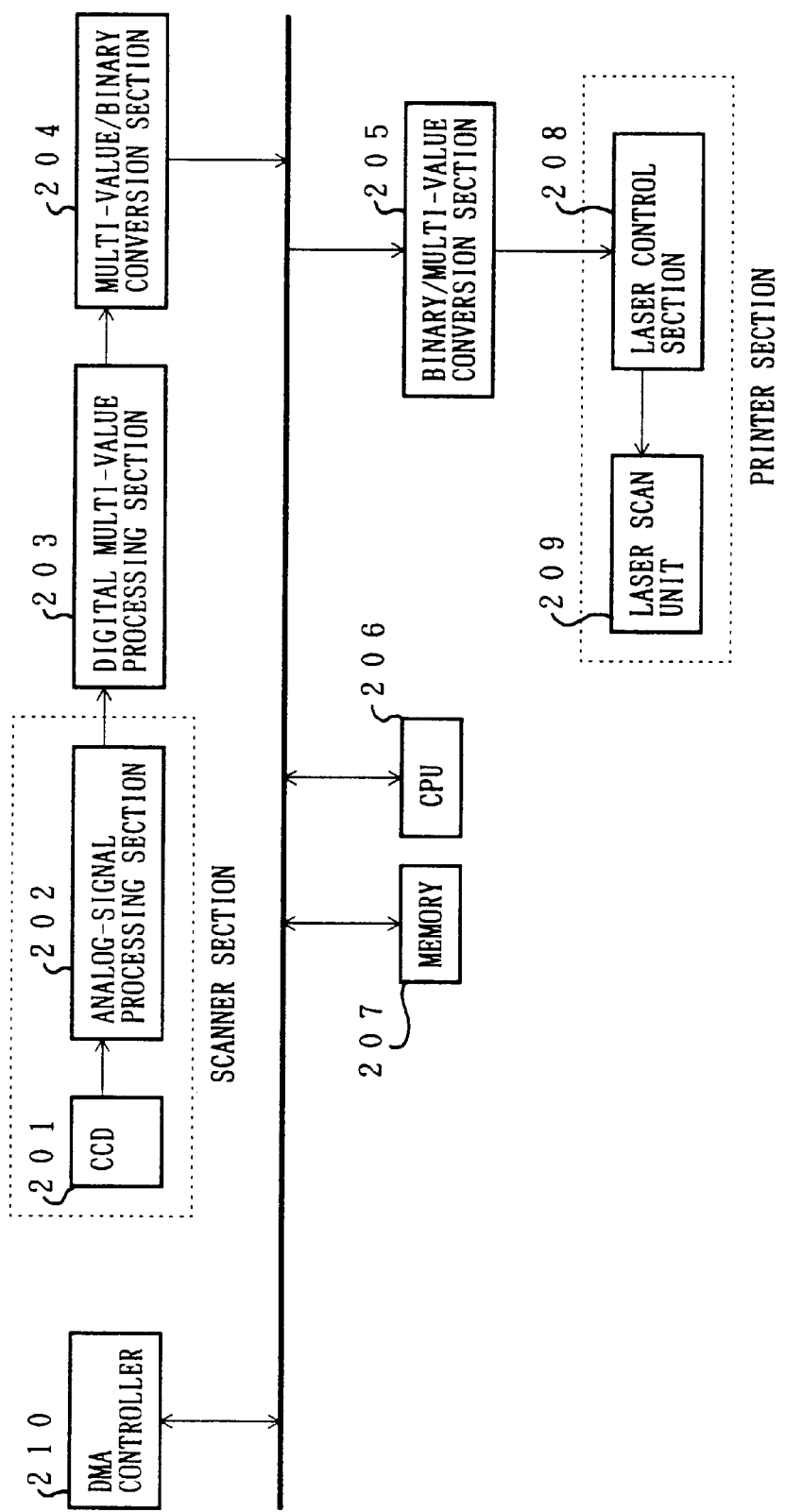
FIG. 9 is a block diagram of a digital copying machine in which a conventional DMA controller is installed.
Figure 10:
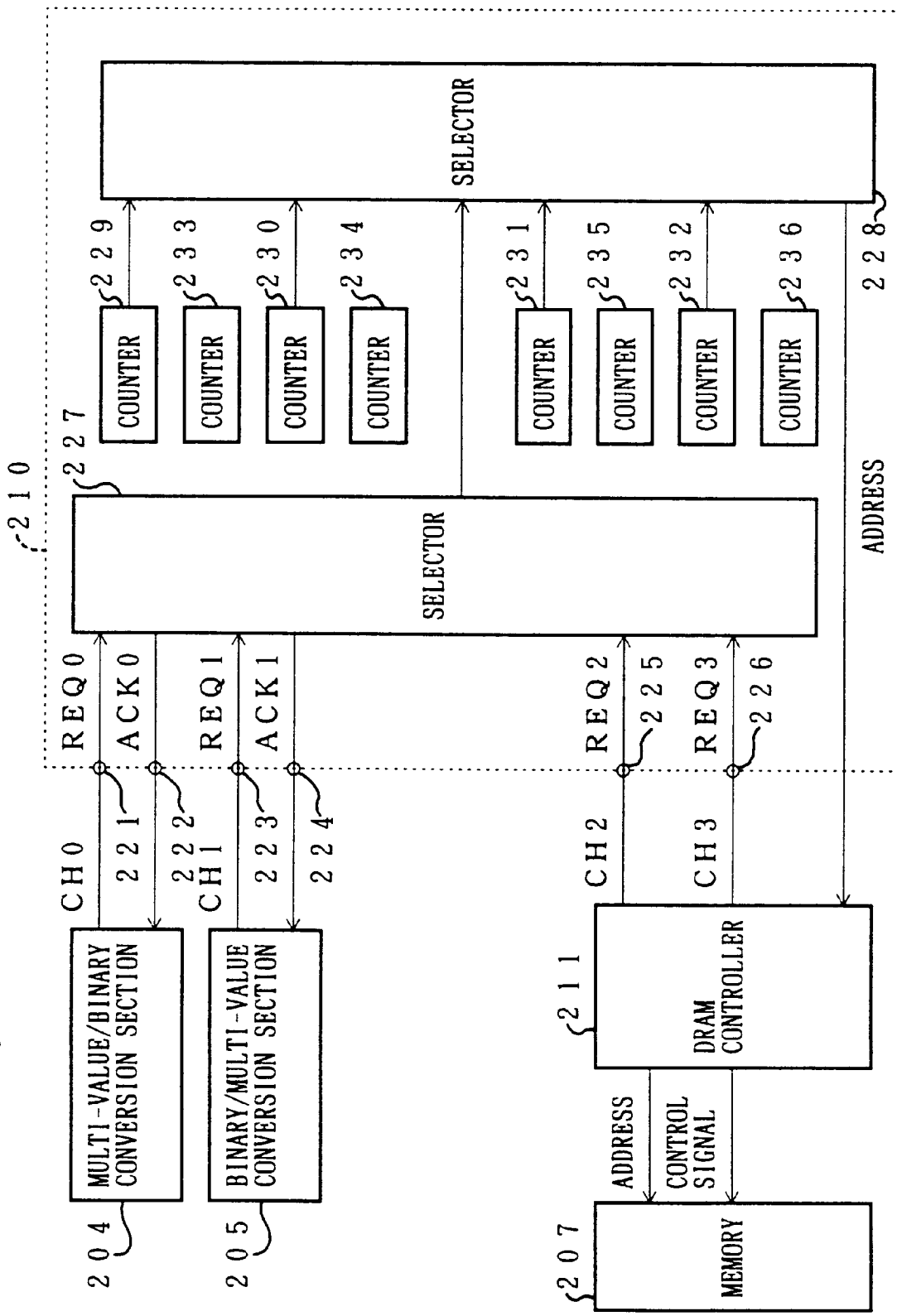
FIG. 10 is a block diagram of the conventional DMA controller.

As illustrated in FIG. 2, in the present embodiment, a DMA controller 10 is installed in a digital copying machine. This digital copying machine has the same construction as the digital copying machine shown in FIG. 9. Therefore, a CCD 1, an analog-signal processing section 2, a digital multi-value image processing section 3, a multi-value/binary conversion section 4, a binary/multi-value conversion section 5, a CPU 6, a memory 7, a laser control section 8, and a laser scan unit 9 respectively correspond to the aforementioned CCD 201, analog-signal processing section 202, digital multi-value image processing section 203, multi-value/binary conversion section 204, binary/multi-value conversion section 205, CPU 206, memory 207, laser control section 208 and laser scan unit 209; therefore, the description thereof is omitted.

Figure 1:
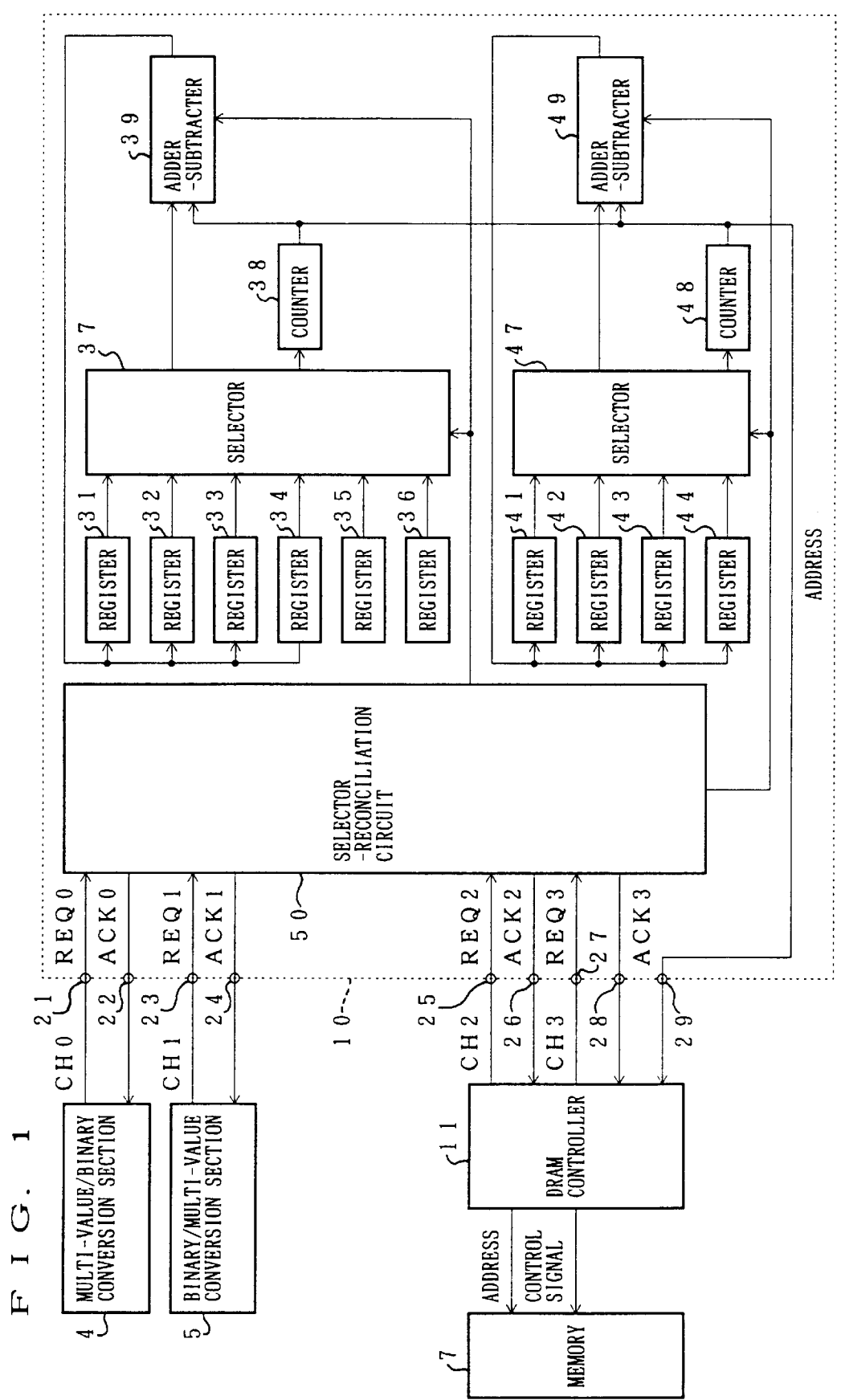
FIG. 1 is a block diagram showing a DMA controller of one embodiment of the present invention.

The DMA controller 10 has a construction as shown in FIG. 1. In FIG. 1, the DMA controller 10 is provided with input terminals 21 and 23 for data-transfer request signals that respectively correspond to channels CH0 and CH1 and output terminals 22 and 24 for data-transfer response signals that respectively correspond to the channels CH0 and CH1. The transferred data is inputted and outputted in synchronism with the data-transfer response signals (ACK0 and ACK1). Further, the DMA controller 10 is provided with input terminals 25 and 27 for data-transfer request signals that respectively correspond to channels CH2 and CH3, output terminals 26 and 28 for data-transfer response signals that respectively correspond to the channels CH2 and CH3, and an address output terminal 29.

In FIG. 1, the channel CH0 is connected to the output section of the multi-value/binary conversion section 4 that functions as an I/O device, that is, an output-image buffer. The channel CH1 is connected to the input section of the binary/multi-value conversion section 5 that functions as an I/O device, that is, an input-image buffer. Further, the channel CH2, the channel CH3 and the address output terminal 29 are connected to the DRAM controller 11. The DRAM controller 11 is alternatively installed either in the CPU 6 or in the DMA controller 10, or placed independently; therefore, it is not shown in FIG. 2.

Here, in the case when the DRAM controller 11 and the DMA controller 10 are formed in one chip, the above-mentioned terminals 25 through 29 are actually not installed. In other words, the DRAM controller 11 and the DMA controller 10 are internally connected on the same single chip.

Moreover, the DMA controller 10 is provided with a selector-reconciliation circuit 50 functioning as a reconciliation means, selectors 37 and 47, counters 38 and 48, adder-subtracters 39 and 49, registers 31 through 36, and registers 41 through 44.

Here, each of the registers 31 and 33 serves as the first and second registers, the registers 32 and 34 serve the third resisters, the register 41 serves as the first register, the register 42 serves as the second register, and the register 43 serves as the third register respectively. Each of the registers 35 and 36 serves as the fourth register, the fifth register, the sixth register and a storage means. Moreover, the counter 38 and the adder-subtracter 39, as well as the counter 48 and the adder-subtracter 49, serve as an operation means.

The registers 31 and 33 are starting-address registers of the respective channels CH0 and CH1, and store the starting addresses of the transfer-destination or transfer-origin memory of the CH0 and CH1 respectively. The transfer-destination or transfer-origin memory refers to a buffer of the memory 7 or the I/O device. The registers 32 and 34 are word-counter registers of the CH0 and CH1, and store the numbers of words of transfer data through the CH0 and CH1 respectively. The registers 35 and 36 are control registers of the CH0 and CH1, and store pieces of information to determine whether the data-transfer-destination is the I/O device or the memory, whether the data-transfer-origin is the I/O device or the memory, and what is the burst number, as well as information indicating the order of preference of data-transfer.

The registers 41 and 42 are starting-address registers of the respective channels CH2 and CH3, and store the starting addresses of memory of the CH2 and CH3 respectively. The register 43 is a word-counter register of the CH2 and CH3, and stores the numbers of words of transfer data through the CH2 and CH3 respectively. The register 44 is a control register of the CH2 and CH3, and stores pieces of information, such as access modes for memory, types of memory and the number of "waiting processes" in the memory. The CPU 6 carries out the initial settings of the registers 31 through 36 as well as the registers 41 through 44, that is, the starting addresses in the registers 31, 33, 41 and 42, the numbers of transfer words in the registers 32, 34 and 43, and various settings in the control registers 35, 36 and 44.

The selector-reconciliation circuit 50 selects channels to be used in accordance with inputs, etc., of the data-transfer-request signals to the input terminals 21, 23, 25 and 27 for data-transfer-request signals. Further, the selector-reconciliation circuit 50, upon receipt of a plurality of data-transfer-request signals at the same time, selects the data-transfer-request signals to be taken in based upon the predetermined order of preference. Moreover, the selector-reconciliation circuit 50, upon receipt of a data-transfer request signal with a higher order of preference during a transfer operation of data with a lower order of preference, carries out a reconciliation so as to transfer data in accordance with the order of preference. Here, this reconciliation function is not specifically used in the explanations in the present embodiment 1 and embodiments 2 and 3 which will be made later.

The selectors 37 and 47 select registers to be used in accordance with instructions from the selector-reconciliation circuit 50. The counters 38 and 48 count addresses and the burst number, as will be described later. The adder-subtracters 39 and 49 carry out calculations of addresses.

The functions of the registers 31 through 34 as well as the registers 41 through 44 and the contents of data to be stored are classified, and shown in Table 1.

TABLE 1

| Address | Name of Register | Contents of Storage |
| --- | --- | --- |
| 0xFFFF0000 | Register 31 CH0 Starting address Register | Starting address of Transfer-Destination or Transfer-Origin Memory of CH0 |
| 0xFFFF0001 | Register 33 CH1 Starting address Register | Starting address of Transfer-Destination or Transfer-Origin Memory of CH1 |
| 0xFFFF0002 | Register 32 CH0 Word Counter Register | Number of Data-Transfer Words of CH0 |
| 0xFFFF0003 | Register 34 CH1 Word Counter Register | Number of Data-Transfer Words of CH1 |
| 0xFFFF0004 | Register 35 CH0 Control Register | Tran.Des. (I/O or Memory?) Tran.Ori.(I/O or Memory?) Burst Num. (How many?) Deg. of Pre. of Transfer |
| 0xFFFF0005 | Register 36 CH1 Control Register | Tran.Des.(I/O or Memory?) Tran.Ori.(I/O or Memory?) Burst Num. (How many?) Deg. of Pre. of Transfer |

TABLE 1-continued

| Address | Name of Register | Contents of Storage |
| --- | --- | --- |
| 0xFFFF0006 | Register 41<br>CH2 Starting address<br>Register | Starting address of<br>Memory of CH2 |
| 0xFFFF0007 | Register 43<br>CH2.3 Word Counter Register | Number of Data-Transfer<br>Words of CH2.3 |
| 0xFFFF0008 | Register 42<br>CH3 Starting address<br>Register | Starting address of<br>Memory of CH3 |
| 0xFFFF0009 | Register 44<br>CH2.3 Control Register | Access Mode of Memory<br>Type of Memory<br>Wait Number of Memory |

In the present embodiment, the register 35, that is, the control register of the CH0, sets the memory 7 as a transfer-destination , and sets the I/O device as a transfer-origin. Further, the register 36, that is, the control register of the CH1, sets the memory 7 as a transfer-origin, and sets the I/O device as a transfer-destination .

In this arrangement, the present DMA controller 10 makes it possible to carry out, for example, the following data transfers: the DMA data-transfer operation from the multi-value/binary conversion section 4 (I/O device) to the memory 7 using the CH0 and CH2; the DMA data-transfer operation from the memory 7 to the binary/multi-value conversion section 5 (I/O device) using the CH3 and CH1; and the DMA memory-to-memory data-transfer operation inside the memory 7 using the CH2 and CH3.

Therefore, in the present DMA controller 10, with respect to the data transfer between the I/O devices and the memory 7, for example, the total two channels, that is, one channel using the CH0 and CH2 plus one channel using the CH3 and CH1, are available. Moreover, with respect to the memory-to-memory data transfer inside the memory 7, one channel using the CH2 and CH3 is available. In the case of the data transfer between the I/O device and the memory 7 as well as the memory-to-memory data transfer inside the memory 7, the CH2 and CH3 are commonly utilized.

Here, the memory-to-memory data transfer inside the memory 7 refers to, for example, a process wherein an address of certain data is changed inside the memory 7.

First, an explanation will be given of the data-transfer operation from the multi-value/binary conversion section 4 to the memory 7.

Image data, which has been read by, for example, a scanner (not shown) of a digital copying machine shown in FIG. 2, is converted into binary image data by the multi-value/binary conversion section 4, and stored in an output-image buffer that is installed in the multi-value/binary conversion section 4. When the buffer becomes full, the multi-value/binary conversion section 4 outputs a data-transfer-request signal (REQ0) to the DMA controller 10. Accordingly, the DMA controller 10 transfers the binary image data in the buffer to the memory 7.

Referring to FIG. 1, this operation will be discussed in more detail. The data-transfer-request signal (REQ0), released from the multi-value/binary conversion section 4, is inputted to the input terminal 21 for the data-transfer-request signals of the channel CH0, and the signal is further inputted to the selector-reconciliation circuit 50 of the DMA controller 10. The selector-reconciliation circuit 50 confirms the degree of preference of the data transfer in the multi-value/binary conversion section 4 based upon information stored in the register 35.

At this time, if there has not been inputted any data-transfer-request having a higher degree of preference than the data transfer from the multi-value/binary conversion section 4 to the memory 7, the selector-reconciliation circuit 50 allows the counter 38 to load the starting-address value of the transfer-origin stored in the register 31 through the selector 37.

Next, the counter 38 counts the address as many times as the number of transfer words for one transfer request which has been preliminarily set in the register 35, that is, the burst number. In the present DMA controller 10, the burst number is set to eight. Therefore, the counter 38 counts the address eight times. The resulting address is transferred to the DRAM controller 11, and is outputted from the DRAM controller 11 to the memory 7 in synchronism with a control signal that has been generated by the DRAM controller 11.

Moreover, in synchronism with the output of the control signal from the DRAM controller 11, a data-transfer response signal (ACK0) is outputted from the DMA controller 10 to the multi-value/binary conversion section 4 through the output terminal 22 for the data-transfer response signals. Thus, the multi-value/binary conversion section 4 outputs data that has been held in the buffer in synchronism with the data-transfer response signal (ACK0) . The data is written into the memory 7 in accordance with outputs from the DRAM controller 11 (*RAS, *CAS, *WE, and Row/Column address).

Upon completion of this writing process, the start-address value of the transfer-destination , which has been stored in the register 33, is added by the burst number 8 in the adder-subtracter 39. In this operation, from the selector-reconciliation circuit 50, a signal for selecting the register 33 is released to the selector 37, and a signal for selecting an adding process is released to the adder-subtracter 39. Thus, the counter value, 8, of the counter 38 and the value stored in the register 33 are added, and the resulting value, that is, the value that exceeds the original value by 8, is newly stored in the register 33. The value of the register 31 is updated in the same manner. Furthermore, in the same manner, the number of words to be transferred, stored in the register 32, is subtracted by 8, and the corresponding value is newly stored in the register 32.

Next, an explanation will be given of the data-transfer operation from the memory 7 to the binary/multi-value conversion section 5.

The binary/multi-value conversion section 5 is an I/O device which converts binary image data held by the memory 7 shown in FIG. 2 into multi-value image data, and sends it to the laser scan unit 9. In the binary/multi-value conversion section 5, binary image data is inputted thereto, and the binary data is converted into multi-values, and released in synchronism with a transfer clock to the laser control section 8. The binary/multi-value conversion section 5, which has an input buffer for storing data transferred from the memory 7 installed therein, converts the data inside the input buffer into multi-values, and outputs the values.

Once the input buffer has become empty of data, the binary/multi-value conversion section 5 outputs a data-transfer-request signal (RQE1) to the input terminal 23 for the data-transfer-request signal of the channel CH1. For example, supposing that the video rate of the laser is 20 ns per pixel, and that the capacity of the input buffer is equivalent to 8 words with 16 bits per word, the data-transfer-request signal (RQE1) is outputted once every 2.56 micro-seconds.

Upon receipt of the data-transfer-request signal (RQE1) , the DMA controller 10 allows the selector 37 to select the register 33. Therefore, the data which has been set in the register 33 and the count value of the counter 38 are added by the adder-subtracter 39, and the resulting data, that is, the corresponding address, is transferred to the DRAM controller 11.

The DRAM controller 11 outputs the address to the memory 7 in synchronism with the control signals (*RAS, *CAS, etc.). Thus, the binary image data is released from the memory 7, and the data is inputted to the binary/multi-value conversion section 5 in synchronism with the synchronous signals. When the data corresponding to one word has been inputted to the binary/multi-value conversion section 5 in this manner, the counter 38 is incremented.

Thereafter, in the same manner, the value of the counter 38 and the data that has been set in the register 33 are added by the adder-subtracter 39, and the resulting value is transferred to the DRAM controller 11. The DRAM controller 11 releases the address to the memory 7 in synchronism with the control signals (*RAS, *CAS, etc.). Consequently, binary image data is released from the memory 7, and the data is inputted to the binary/multi-value conversion section 5 in synchronism with the synchronous signals.

The above-mentioned operation is repeated as many times as the burst number that has been set in the register 35. The burst number is set to as many as the step number of the input buffer of the binary/multi-value conversion section 5. In the present DMA controller 10, since the input buffer of the binary/multi-value conversion section 5 is set to be equivalent to 8 words, the burst number with respect to one data-transfer-request signal (RQE1) is eight times. Further, the value obtained by adding the last burst number (8 in the present embodiment) is written into the register 33. This allows the memory address to continue even if the next data-transfer-request signal (RQE1) has been inputted.

The image data, transferred to the input buffer of the binary/multi-value conversion section 5, is converted into multi-value image data, and transferred to the laser scan unit 9. When the input buffer of the binary/multi-value conversion section 5 has become empty, the above-mentioned operation is repeated. The repetition is carried out until the value of the number of words of transferred data, preliminarily written into the register 34 by the CPU 6, has reduced to 0. The subtraction of the resister 34 is carried out as many times as the burst number, and the adder-subtracter 39 is also used in the subtracting operation.

Next, an explanation will be given of the memory-to-memory data-transfer operation inside the memory 7. This transfer process is used when, for example, an editing process, such as rotation, reduction, enlargement or mirror-image process (right-left inversion), is carried out.

When this operation is carried out, the transfer-origin memory that has been preliminarily stored in the register 41 by the CPU 6, that is, the starting address of the memory 7, is selected by the selector 47. The selected starting address is added to the value of the counter 48 by the adder-subtracter 49. The result of this addition, that is, the resulting address, is inputted to the DRAM controller 11, and the DRAM controller 11 reads the data of the address in the memory 7.

Next, the transfer-destination memory that has been preliminarily stored in the register 42 by the CPU 6, that is, the starting address of the memory 7, is selected by the selector 47. The selected starting address is added to the value of the counter 48 by the adder-subtracter 49. The result of this addition, that is, the resulting address, is inputted to the DRAM controller 11. The DRAM controller 11 writes the data that has been read to the address in the memory 7.

Thereafter, the value of the counter 48 is incremented, and the operation described above is repeated. The repetition is carried out until the value of the counter 48 has become the same as the value of the number of data-transfer words that has been stored in the register 43.

The above-mentioned memory-to-memory data-transfer operation inside the memory 7 is carried out when image data is edited as described earlier. The editing process, that is, the data-transfer operation from the memory 7 to the memory 7, is carried out after the input of the image data, that is, the data-transfer operation from the multi-value/binary conversion section 4 to the memory 7, has been completed. Further, the output of the image data, that is, the data-transfer operation from the memory 7 to the binary/multi-value conversion section 5, is carried out after the editing process has been completed. Therefore, although the two counters 38 and 48, shown in FIG. 1, are used in the above-mentioned three types of data transfer, these data-transfer operations are carried out respectively in an independent manner. Therefore, no degradation occurs in the performance of the above-mentioned counters 38 and 48 during the respective data-transfer operations.

As described above, in the present DMA controller 10, two channels, that is, the channels CH0 and CH2 or the channels CH1 and CH3, are used in the data-transfer operations between the I/O devices and the memory 7. Further, the channels CH2 and CH3 are used in the memory-to-memory data-transfer operation inside the memory 7.

Moreover, the channel CH0 is always used for reading data with respect to the I/O devices, and it is always used for writing data with respect to the memory 7. On the other hand, the channel CH1 is always used for writing data with respect to the I/O devices, and it is always used for reading data with respect to the memory 7. Therefore, with respect to the channel CH0 and the channel CH1, the direction of data transfer is reversed.

As described above, since the direction of data transfer is fixed in the DMA controller 10 shown in FIG. 1, it becomes possible to simplify the processes and also to increase the transfer speed. Further, it is possible to reduce the overhead time due to settings of registers and also to minimize the circuit size. Table 2 shows examples of the respective registers in this case.

TABLE 2

| Address | Name of Register | Contents of Storage |
| --- | --- | --- |
| 0xFFFF0000 | Register 31<br>CH0 Starting address Register | Starting address of Memory of CH0 |
| 0xFFFF0001 | Register 33<br>CH1 Starting address Register | Starting address of Memory of CH1 |
| 0xFFFF0002 | Register 32<br>CH0 Word Counter Register | Number of Data-Transfer Words of CH0 |
| 0xFFFF0003 | Register 34<br>CH1 Word Counter Register | Number of Data-Transfer Words of CH1 |
| 0xFFFF0004 | Register 35<br>CH0 Control Register | Burst Num. (How many?)<br>Deg. of Preference of Transfer |
| 0xFFFF0005 | Register 36<br>CH1 Control Register | Burst Num. (How many?)<br>Deg. of Preference of Transfer |
| 0xFFFF0006 | Register 41<br>CH2 Starting address Register | Starting address of Memory of CH2 |
| 0xFFFF0007 | Register 43<br>CH2.3 Word Counter Register | Number of Data-Transfer Words of CH2.3 |

TABLE 2-continued

| Address | Name of Register | Contents of Storage |
| --- | --- | --- |
| 0xFFFF0008 | Register 42<br>CH3 Starting address<br>Register | Starting address of<br>Memory of CH3 |
| 0xFFFF0009 | Register 44<br>CH2.3 Control Register | Access Mode of Memory<br>Type of Memory<br>Wait Number of Memory |

As explained by Table 2, in this arrangement of the DMA controller 10, less information is required by the register 35 (the control register of CH0) and the register 36 (the control register of CH1) so that the arrangement is simplified.

Moreover, in the above-mentioned DMA controller 10, two pairs of the input-terminals 21 and 23 for data-transfer request signals and the output-terminals 22 and 24 for data-transfer response signals are provided, and one pair of the input-terminal 21 for data-transfer request signals and the output-terminal 22 for data-transfer response signals are used for the transfer operation from the memory to the I/O devices, and the other pair of the input-terminal 23 for data-transfer request signals and the output-terminal 24 for data-transfer response signals are used for the transfer operation from the I/O devices to the memory.

With this arrangement, the DMA controller 10 is allowed to have a modular construction that becomes applicable to every system by merely changing the number of macros (units) of the DMA controller 10 in accordance with the system to which it is applied. Therefore, the application of the present DMA controller 10 makes it possible to easily expand and readily design the system.

Moreover, the multi-value/binary conversion section 4, which carries out the DMA transfer operations from the I/O devices to the memory, is provided as an image-processing chip for converting multi-value image to binary image, and the binary/multi-value conversion section 5, which carries out the DMA transfer operations from the memory to the I/O devices, is provided as an image-processing chip for converting binary image to multi-value image. Here, the scanner is connected to the multi-value/binary conversion section 4, and the printer is connected to the binary/multi-value conversion section 5.

Thus, by using a simpler circuit construction than conventional constructions, it is possible to carry out complex reconciliation processes with respect to data-transfer request signals at high speeds. In particular, it becomes possible to easily construct a system which can prevent loss of printed image.

Additionally, the above-mentioned multi-value/binary conversion section 4 converts multi-value image to binary image upon carrying out the DMA transfer operation from the I/O devices to the memory; however, in place of the multi-value/binary conversion section 4, an image-processing chip for converting multi-value image to quaternary image may be used. In this case, an image-processing chip for converting quaternary image to multi-value image is of course used in place of the binary/multi-value conversion section 5.

Moreover, in the present embodiment, the explanation has been given by exemplifying a digital copying machine; however, the DMA controller is also preferably applied to apparatuses, such as facsimiles and multi-function apparatuses, in which an image-reading system and an image-writing system are individually installed, because the direction of data is fixed in those apparatuses.

Embodiment 2

The following description will discuss another embodiment of the present invention.

Figure 3:
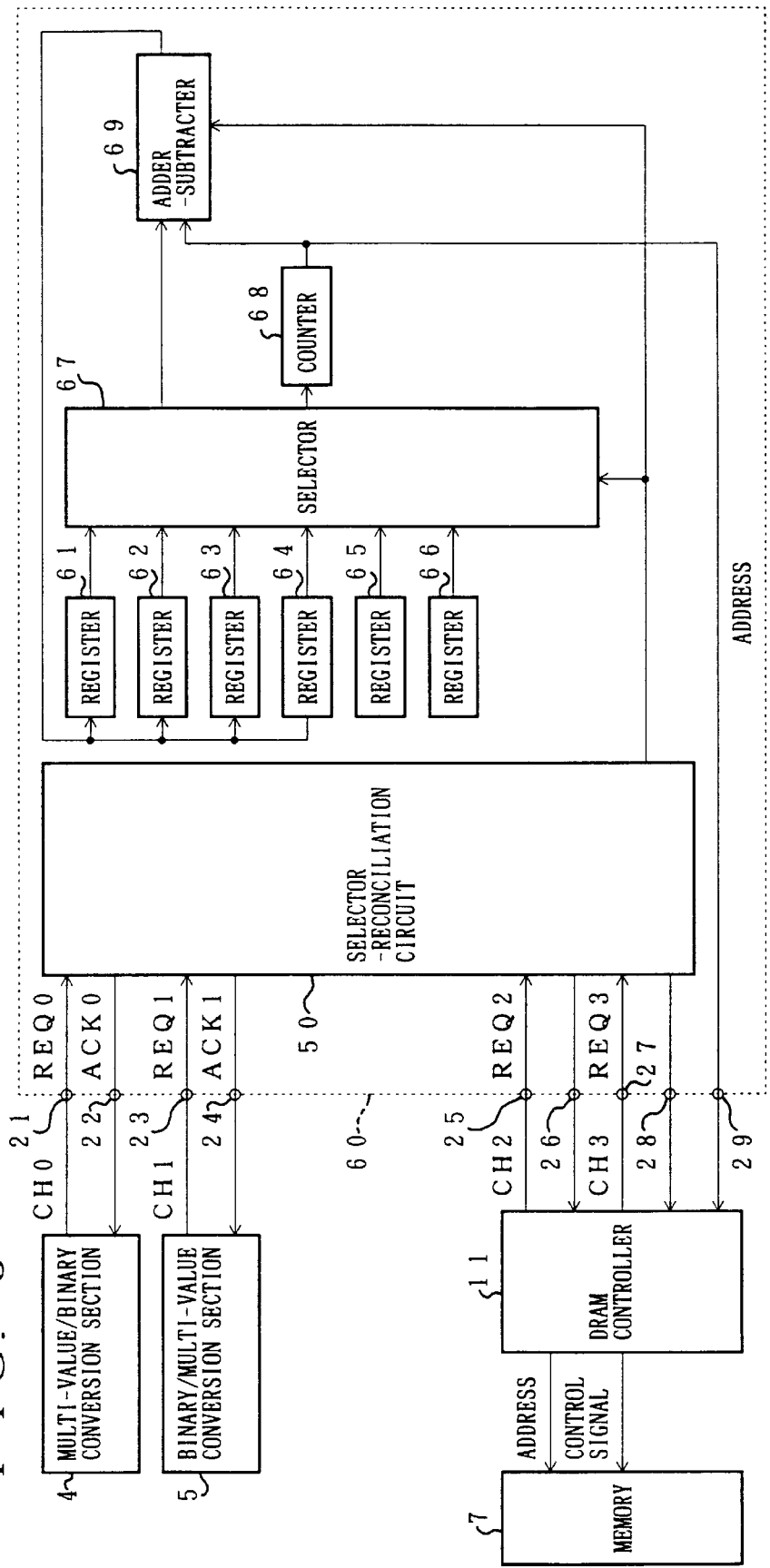
FIG. 3 is a block diagram showing a DMA controller of another embodiment of the present invention.

As illustrated in FIG. 3, in the present DMA controller 60, a register 61 serves compatibly as the register 31 of the channel CH0 and the register 42 of the channel CH3, and a register 63 serves compatibly as the register 33 of the channel CH1 and the register 41 of the channel CH2 in the DMA controller 10 shown in FIG. 1. Further, a register 62 serves compatibly as the register 32 of the channel CH0 and the register 43 of the channel CH3, and a register 64 serves compatibly as the register 34 of the channel CH1 and the register 43 of the channel CH2. In other words, the register 61 is used for storing the starting address of the transfer-destination memory of the channels CH0 and CH3, the register 63 is used for storing the starting address of the transfer-origin memory of the channels CH1 and CH2, the register 62 is used for storing the number of data-transfer words of the channels CH0 and CH3, and the register 64 is used for storing the number of data-transfer words of the channels CH1 and CH2.

Further, the DMA controller 60 is provided with a register 65 which replaces the registers 35 and 44, a register 66 which replaces the registers 36 and 44, a selector 67 which replaces the selectors 37 and 47, a counter 68 which replaces the counters 38 and 48, and an adder-subtracter 69 which replaces the adder-subtracters 39 and 49.

Thus, the DMA controller 60 is further simplified in its circuit construction, and achieves a greater reduction in cost. In the present DMA controller 60 also, not only the data-transfer operation between the I/O devices and the memory 7, but also the memory-to-memory transfer operation inside the memory 7 is available merely by using such a small number of registers.

Here, the register 61 serves as the first register, the register 63 serves as the second register, the registers 62 and 64 serve as the third registers, and the registers 65 and 66 serve as the fourth, fifth and sixth registers, and a storage means. The functions of the respective registers and the contents of data to be stored are classified, and shown in Table 3.

TABLE 3

| Address | Name of Register | Contents of Storage |
| --- | --- | --- |
| 0xFFFF0000 | Register 61<br>CH0,3 Starting address<br>Register | Starting address of<br>Transfer-destination<br>Memory of CH0,3<br>(Commonly Used for<br>Memory-to-Memory<br>Transfer) |
| 0xFFFF0001 | Register 63<br>CH1,2 Starting address<br>Register | Starting address of<br>Transfer-Origin Memory of<br>CH1,2 (Commonly Used<br>for Memory-to-Memory<br>Transfer) |
| 0xFFFF0002 | Register 62<br>CH0,3 Word Counter Register | Number of Data-Transfer<br>Words of CH0,3 |
| 0xFFFF0003 | Register 64<br>CH1,2 Word Counter Register | Number of Data-Transfer<br>Words of CH1,2 |
| 0xFFFF0004 | Register 65<br>CH0,3 Control Register | Burst Num. (How many?)<br>Degree of Preference of<br>Transfer<br>Transfer States (Memory-<br>to-Memory? or I/O-to-<br>Memory?) |

TABLE 3-continued

| Address | Name of Register | Contents of Storage |
| --- | --- | --- |
| 0xFFFF0005 | Register 66<br>CH1,2 Control Register | Burst Num. (How many?)<br>Degree of Preference of Transfer<br>Transfer States (Memory-to-Memory? or I/O-to-Memory?) |

In the present DMA controller 60, in the case of the transfer operations from the I/O devices to the memory 7, the loading of the address value to the counter 68 is carried out with respect to the register 61 and the register 63, in the same manner as described earlier.

On the other hand, in the case of the data transfer from the memory 7 to the memory 7, the CPU 6 writes the address of transfer-destination and the address of transfer-origin to the register 61 and the register 63. In this case, after having set the registers 65 and 66 to the data-transfer state from the memory 7 to the memory 7, the CPU 6 sets the starting address of the transfer-destination memory in the register 61, sets the starting address of the transfer-origin memory in the register 63, and sets the number of data-transfer words in the register 62. The other operations are carried out in the same manner as those described in the aforementioned embodiment 1.

In the data-transfer operation from the memory 7 to the memory 7, image data can be converted to mirror-image data (right-left inverted image) by decrementing the counter 68. Further, it is possible to easily carry out a resolution-converting process with respect to image data by changing the value to be counted.

Embodiment 3

The following description will discuss still another embodiment of the present invention.

Figure 4:
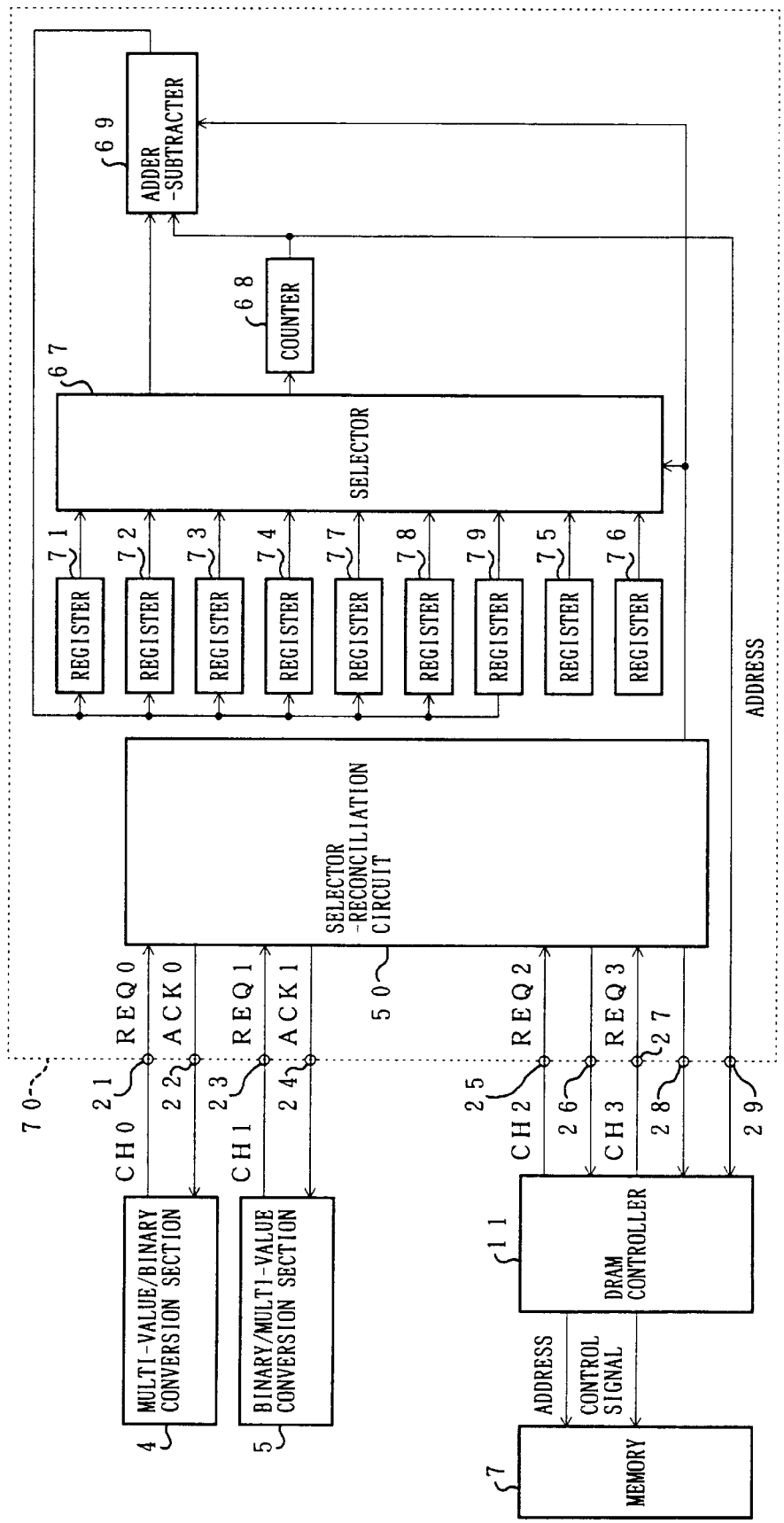
FIG. 4 is a block diagram showing a DMA controller of still another embodiment of the present invention.

As illustrated in FIG. 4, as compared with the DMA controller 60 shown in FIG. 3, the counter 68 and the adder-subtracter 69, which are used for the data transfer between the I/O devices and the memory 7 and the memory-to-memory data transfer inside the memory 7, are commonly used in the present DMA controller 70 in the same manner for the respective data-transfer operations. However, the registers are aligned in parallel with each other so as to be used for the respective data-transfer operations.

In other words, a register 71 is used for storing the starting address of the transfer-destination memory of the channels CH0 and CH3, a register 73 is used for storing the starting address of the transfer-origin memory of the channels CH1 and CH2, a register 72 is used for storing the number of data-transfer words of the channels CH0 and CH3, and a resister 74 is used for storing the number of data-transfer words of the channels CH1 and CH2. Further, a register 75 is a control register of the channels CH0 and CH3, and a register 76 is a control register of the channels CH1 and CH2. Moreover, a register 77 is used for storing the starting address of the transfer-destination memory upon carrying out the data transfer from the memory 7 to the memory 7, a register 78 is used for storing the starting address of the transfer-origin memory upon carrying out the data transfer from the memory 7 to the memory 7, and a register 79 is used for storing the number of data-transfer words upon carrying out the data transfer from the memory 7 to the memory 7.

The registers 71 and 77 constitute the first registers, the registers 73 and 78 constitute the second registers, the registers 72, 74 and 79 constitute the third registers, and the registers 75 and 76 constitute the fourth register, the fifth register, the sixth register and a storage means. The functions of the respective registers and the contents of data to be stored are classified, and shown in Table 4.

TABLE 4

| Address | Name of Register | Contents of Storage |
| --- | --- | --- |
| 0xFFFF0000 | Register 71<br>CH0,3 Starting address Register | Starting address of Transfer-Destination Memory of CH0,3 |
| 0xFFFF0001 | Register 73<br>CH1,2 Starting address Register | Starting address of Transfer-Origin Memory of CH1,2 |
| 0xFFFF0002 | Register 72<br>CH0,3 Word Counter Register | Number of Data-Transfer Words of CH0,3 |
| 0xFFFF0003 | Register 74<br>CH1,2 Word Counter Register | Number of Data-Transfer Words of CH1,2 |
| 0xFFFF0004 | Register 75<br>CH0,3 Control Register | Burst Num. (How many?)<br>Deg. of Pre. of Transfer<br>Transfer States (Mem-to-Mem? I/O-to-Memory?) |
| 0xFFFF0005 | Register 76<br>CH1,2 Control Register | Burst Num. (How many?)<br>Deg. of Pre. of Transfer<br>Transfer States (Mem-to-Mem? I/O-to-Memory?) |
| xFFFF0006 | Register 77<br>Starting address Register of Transfer-destination | Starting address of Transfer-destination Memory (in Mem-to-Mem Transfer) |
| 0xFFFF0007 | Register 78<br>Starting address Register of Transfer-Origin | Starting address of Transfer-Origin Memory (in Mem-to-Mem Transfer) |
| 0xFFFF0008 | Register 79 | Number of Transfer Words (in Mem-to-Mem Transfer) |

Since the operation of the DMA controller 70 has been clearly shown in the descriptions on the aforementioned DMA controllers, the description thereof is omitted.

The above-mentioned DMA controller 70 makes it possible to provide multiple channels by using a simple construction at low costs, in the same manner as the DMA controller 10 having the registers that have arrangements shown in FIG. 1 and that are indicated by Table 2.

Moreover, although the DMA controller 70 with the registers 77 through 79 has a bigger construction as compared with the DMA controller 60 shown in FIG. 3, changes in settings of the registers, which are made by the CPU 6 depending on modes of data transfer, are reduced in number so that the overhead time can be shortened.

Embodiment 4

The following description will discuss still another embodiment of the present invention.

In the present embodiment, a selector-reconciliation circuit 50 in the DMA controller 70, shown in FIG. 4, carries out a reconciliation operation.

Figure 5:
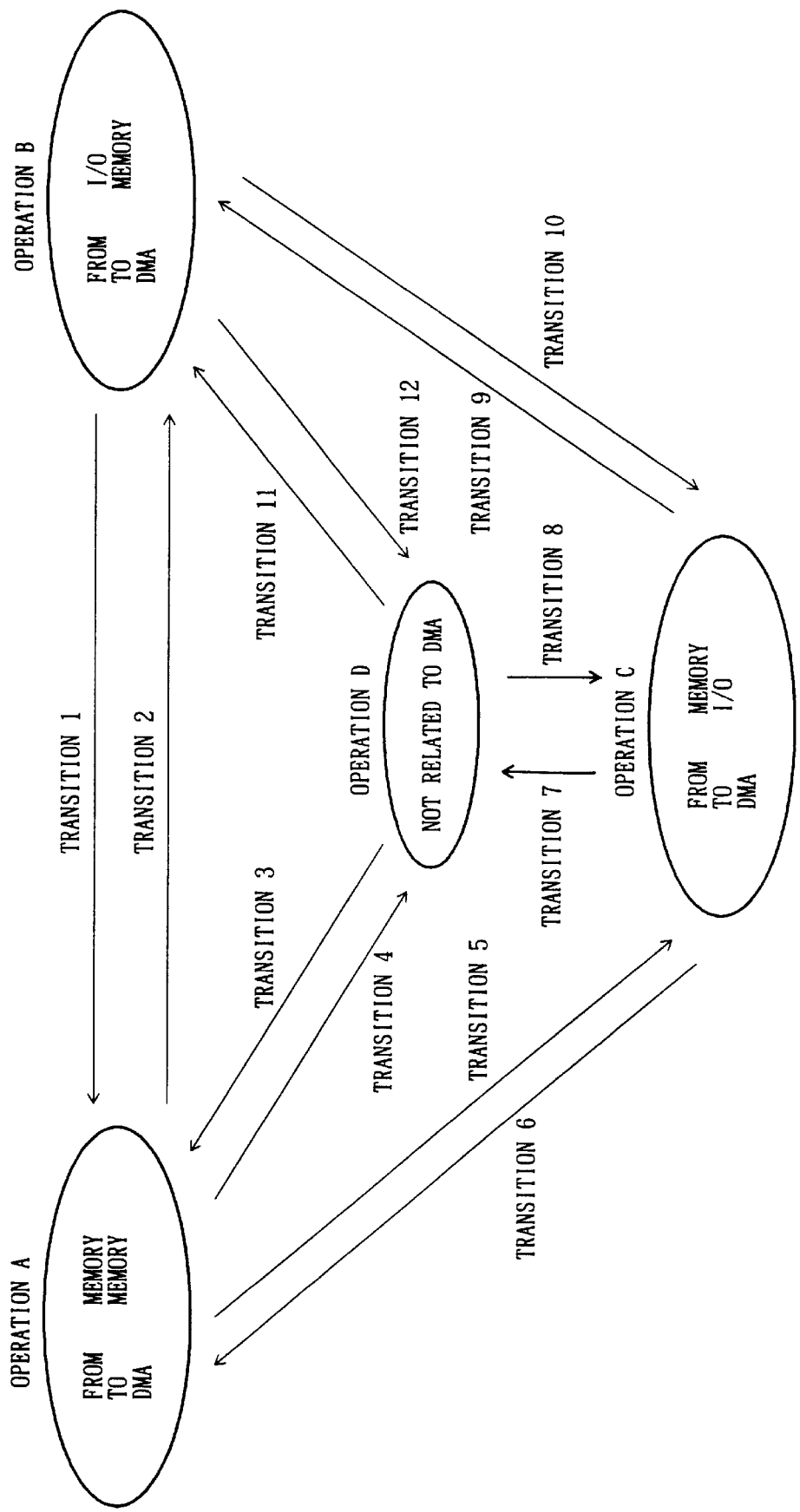
FIG. 5 is an explanatory drawing that indicates transitions of the operations of DMA controller that are carried out depending on the order of preference.

As shown in FIG. 5, in the digital copying machine, operations A, B and C, which are related to the DMA controller 70, and an operation D, which is not related to the DMA controller 70, are carried out. The operation A is a DMA transfer from the memory 7 to the memory 7. The operation B is a DMA transfer from the I/O devices to the memory. The operation C is a DMA transfer from the memory to the I/O devices. The operation D is an operation that is carried out in modes other than the DMA transfer mode. Among the operations A through D, any of transitions 1 through 12 between the operations that are indicated by arrows in FIG. 5, occurs upon receipt of a request related to any of the operations A through D, based on the order of preference of the request.

Here, an explanation will be given of the case in which, for example, a request for the operation A is made while the operation D is being carried out, and a request for the operation B is further made. In this case, the order of preference is set in a descending order from the highest operation C, operation B, operation A to operation D.

The operation A is a transfer operation of image data from the memory 7 to the memory 7 that is used for, for example, an editing process on image data stored in the memory 7. Further, the operation B is a transfer operation of image data from the output image buffer of the multi-value/binary conversion section 4. Here, the image data has been scanned by the scanner section, and processed in the multi-value/binary conversion section 4. Moreover, the operation C is a transfer operation of image data from the memory 7 to the binary/multi-value conversion section 5 that is carried out when the image data is printed in the printer section. The above-mentioned order of preference with respect to the operations A through C is determined based on the following reasons:

The data-transfer operation from the memory 7 to the printer section should be carried out with the highest preference, since a blank portion, that is, loss of data, tends to appear in a printed image if the data transfer operation is suspended for a long time. The data-transfer operation from the scanner section to the memory 7 should be carried out with the second highest preference; although upon occurrence of a loss of data, restoration can be made by re-scanning of the original image, the re-scanning is still required in that case. In contrast, the data-transfer operation from the memory 7 to the memory 7 can be placed in the lowest order of preference; even if a loss of data occurs, it can be easily restored.

With the above-mentioned order of preference set in the data-transfer operations, it becomes possible to prevent loss of image in printed images, even if there are competitive data-transfer requests, for example, the request for data transfer from the scanner section to the memory 7 and the request for data transfer from the printer section to the memory 7.

Next, an explanation will be given of the reconciliation process more specifically.

When an instruction for image-data editing is given to the digital copying machine during the operation D, a transition from the operation D to operation A takes place. In this case, the CPU 6 allows the register 77 of the DMA controller 10 to store the starting address of transfer-destination memory in order to transfer image data from the memory 7 to the memory 7. The CPU 6 further allows the register 78 to store the starting address of transfer-origin memory, as well as allowing the register 79 to store the number of data-transfer words. Thereafter, when the DMA controller 70 is activated, the transition 3 in FIG. 5 occurs and the bus is cut off from the CPU 6 so that the DMA transfer from the memory 7 to the memory 7 is carried out.

At this time, an image data input from the scanner section is being carried out in a parallel manner as described earlier, and when the output image buffer of the multi-value/binary conversion section 4 has been filled with the image data, the multi-value/binary conversion section 4 releases a data-transfer request signal to the DMA controller 70. When the signal is inputted to the input terminal 21 for data-transfer request signals, the transition 2 occurs in the DMA controller 70 so that the operation A is switched to the operation B.

In the course of the transition 2, the selector-reconciliation circuit 50 releases a selection signal to the selector 67 so that the value of the counter 68 is added to the values of the register 77 and the register 78 respectively. Thus, the adder-subtracter 69 adds the value of the counter 68 and the value of the register 77. The added value is written into the register 77. Further, the adder-subtracter 69 adds the value of the counter 68 and the value of the register 78. The added value is written to the register 78 in the same manner.

Next, the selector-reconciliation circuit 50 releases a selection signal to the selector 67 and the adder-subtracter 69 so that the value of the counter 68 is subtracted from the value of the register 79. Thus, the corresponding subtraction is carried out and the result is written to the register 79.

Thereafter, the operation B, that is, the data transfer from the multi-value/binary conversion section 4 to the memory 7, is started. At this time, the selector-reconciliation circuit 50 releases a selection signal to the selector 67 so that the value of the register 71 is loaded to the counter 68. The counter 68 is incremented as many as the burst number that has been set in the register 75. The value of the counter 68 is sent to the DRAM controller 11, and outputted to the memory 7 as a column address and a row address together with the control signals *RAS and *CAS.

Moreover, a data-transfer response signal (ACK0) is outputted from the output-terminal 22 for data-transfer response signals to the multi-value/binary conversion section 4 so that the multi-value/binary conversion section 4 is allowed to output data. The data is sent to the memory 7 together with the above-mentioned column address and row address as well as the control signals *RAS and *CAS, and written into the memory 7.

Upon completion of the data transfer corresponding to the burst number, that is, upon completion of the operation B, the transition 1 in FIG. 5 takes place, and the operation A, which has been suspended, is resumed. At this time, the value of the counter 68 is incremented, and the addition is made until it has the same value as that of the register 79. The value made by adding the values of the counter 68 and the register 77 is set as an address of transfer-destination, and the value made by adding the values of the counter 68 and the register 78 is set as an address of transfer-origin. These addresses are written to the DRAM controller 11. The DRAM controller 11 releases the control signals and addresses, and repeats the writing and reading processes to and from the memories until the value of the counter 68 has become the same value as that of the register 79.

As described above, the present DMA controller 70, upon receipt of a plurality of data-transfer requests, carries out the corresponding data-transfer process based upon a predetermined order of preference. In this case, upon receipt of a data-transfer request with a higher order of preference during the data-transfer operation, the DMA controller 70 temporarily suspends the on-going data-transfer operation, and carries out the data-transfer operation with a higher order of preference beforehand, and then resumes the data-transfer operation that has been suspended. Therefore, it is possible to properly deal with a plurality of data-transfer operations by using a simple construction.

In other words, conventional DMA controllers cannot deal with a new data-transfer request until the on-going data transfer operation has been completed, even if the requested data transfer needs to be preferentially carried out. Therefore, in the conventional DMA controllers, individual DMA controllers, one used for image-data transfer from the scanner section to the memory 7 and the other used for image-data transfer from the memory 7 to the memory 7, are often installed so as to solve the above-mentioned problem. This application makes the construction of the DMA controller bulky, resulting in high costs. However, the present DMA controller 70 successfully solves the above-mentioned problem.

Embodiment 5

The following description will discuss still another embodiment of the present invention.

Figure 6:
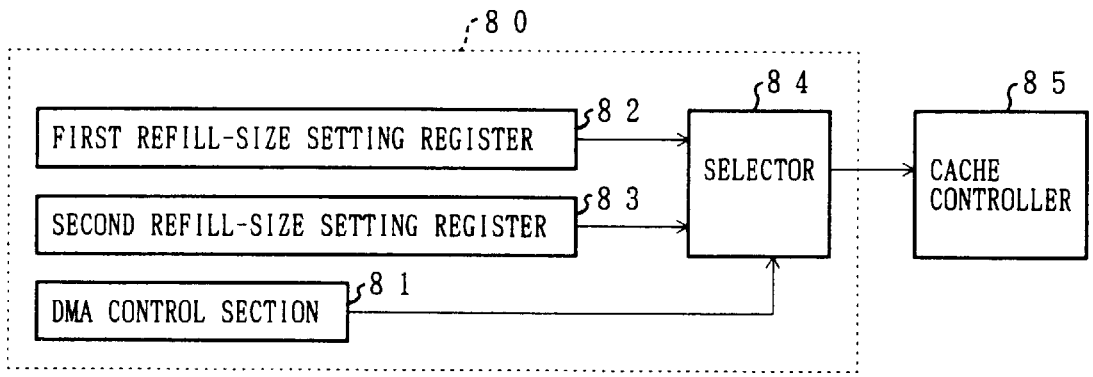
FIG. 6 is a block diagram showing a DMA controller of another embodiment of the present invention.

As illustrated in FIG. 6, the present DMA controller 80 is a data-transfer device that is provided with a DMA control section 81, a first refill-size setting register 82, a second refill-size setting register 83, and a selector 84. The selector 84 is connected to a cache controller 85.

The DMA control section 81 corresponds to, for example, any of the aforementioned DMA controllers 10, 60 and 70 or another DMA controller. The first refill-size setting register 82 stores information for setting the refill size to a normal refill size. The second refill-size setting register 83 stores information for setting the refill size to a size smaller than the refill size that is set by the information stored in the first refill-size setting register 82. The setting size in this case is used for the waiting process for any DMA operation. The selector 84 selects either of the values of the first and second refill-size setting registers 82 and 83, and sends the corresponding value to the cache controller 85.

In the present DMA controller 80, the first and second refill-size setting registers 82 and 83, as well as the selector 84, constitute a refill-size control means.

In the above-mentioned arrangement, in the case of receipt of a signal indicating the DMA waiting state from the DMA control section 81, the selector 84 releases the value of the second refill-size setting register 83 to the cache controller 85, and in the other cases, it releases the value of the first refill-size setting register 82 to the cache controller 85.

With this arrangement, the DMA controller 80 is free from the problem of bulky circuit size, and also free from reduction in performance of CPU 6. The reasons for this are explained as follows:

The RISC processor in the CPU 6 carries out high-speed operations by pipeline-processing simple instructions at high speeds. Since the RISC processor has the cycle time of execution of instructions that is faster than the access time of memories, it has a data cache and an instruction cache, and loads data and instructions from the external memory into the caches. Caches refer to special memories which are installed inside a CPU and to which the CPU makes a high-speed access.

The CPU 6 executes data and instructions inside the cache; however, the data and instructions to be executed are occasionally not available in the cache. This is referred to as a "miss-hit". In such a case, data and instructions located around addresses of the memory 7 in which the necessary data and instructions have been stored are loaded to the caches. This operation is referred to as "refill". Since the necessary data and instructions are likely to exist at adjacent addresses, the greater the size of refill, the smaller the probability of miss-hit, resulting in a better performance of the CPU 6.

However, in the case when a data-transfer request is made during a refilling process, the operation can not be shifted until the refilling process has been completed. For example, in the case when the binary/multi-value conversion section 5 releases a data-transfer request, if the request is preferentially carried out, the transition 8, shown in FIG. 5, is required; however, the transition 8 is not available until the refill has been completed.

It is when data is printed out that the binary/multi-value conversion section 5 makes the data-transfer request to the memory 7. Further, in the case of a page printer such as a laser printer, loss of data might occur unless the data is continuously sent thereto. This situation needs to be avoided by all means.

For this reason, in systems using conventional DMA controllers, in order to avoid loss of data even in the case when the transition 8 is made after completion of the refilling process, the size of a data buffer in the I/O device such as the binary/multi-value conversion section 5 is increased, or the size of refill is simply decreased. However, the increased size of the input-image buffer causes the size of circuit to become bulky, and the decreased size of refill causes low performance of the CPU 6.

Therefore, as described above, in the present DMA controller 80, the size of refill is maintained small in the waiting state for the data-transfer operation by the DMA control section 81, that is, in the DMA waiting state. In other words, if the size of refill is maintained small, processes related to the refill can be completed quickly; thus, it becomes possible to prevent the loss of data in the transferred data without the need for a big input-image buffer in the binary/multi-value conversion section 5. Further, by setting the refill size to a normal size during states other than the DMA waiting state, it becomes possible to prevent low performance of the CPU 6. Moreover, even in a competitive state between the refill and data-transfer, reconciliation is carried out in a favorable manner.

Embodiment 6

The following description will discuss still another embodiment of the present invention.

Figure 7:
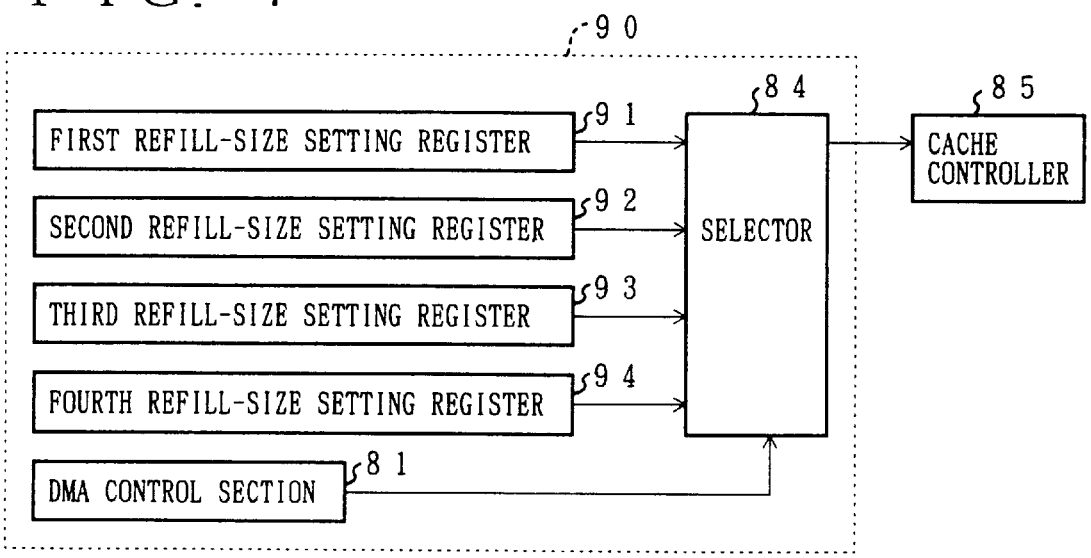
FIG. 7 is a block diagram showing a DMA controller of another embodiment of the present invention.

As illustrated in FIG. 7, the present DMA controller 90 is provided with first through fourth refill-size setting registers 91 through 94, and also provided with the DMA control section 81 in the same manner as the aforementioned DMA controller 80, together with a selector 84. In the present DMA controller 90, the first through fourth refill-size setting registers 91 through 94 and the selector 84 constitute a refill-size control means.

The first refill-size setting register 91 stores information for setting the refill size to a normal refill size, in the same manner as the aforementioned first refill-size setting register 82. The second through fourth refill-size setting registers 92 through 94, on the other hand, store information for setting the refill size to a size smaller than the refill size that is set by the information stored in the first refill-size setting register 91. These second through fourth refill-size setting registers 92 through 94 are used for the waiting process for any DMA operation. Therefore, in the present DMA controller 90 also, it is possible to eliminate the need for a big circuit size, and to prevent reduction in performance of the CPU 6, in the same manner as the aforementioned DMA controller 80.

Moreover, the second refill-size setting register 92 is used for the DMA waiting state from the memory to the I/O devices, the third refill-size setting register 93 is used for the DMA waiting state from the I/O devices to the memory, and the fourth refill-size setting register 94 is used for the DMA waiting state from the memory 7 to the memory 7.

The selector 84 selects the first refill-size setting register 91 in cases other than the DMA waiting states, and in any of the DMA waiting states, it also selects any of the second through fourth refill-size setting registers 92 through 94, depending on which direction the DMA waiting state is related to. In other words, the selector 84 selects the second refill-size setting register 92 in the DMA waiting state from the memory to the I/O devices, it selects the third refill-size setting register 93 in the DMA waiting state from the I/O devices to the memory, and it selects the fourth refill-size setting register 94 in the DMA waiting state from the memory 7 to the memory 7. The signal for indicating which direction the DMA waiting state is related to is supplied from the DMA control section 81 to the selector 84.

Moreover, the refill sizes, indicated by the stored information in the second through fourth refill-size setting registers 92 through 94, are different from each other; the fourth refill-size setting register 94 has the biggest size, followed by the third refill-size setting register 93 and the second refill-size setting register 92 in this order. The settings of the above-mentioned refill sizes with respect to instruction caches are, for example, made as follows:

The first refill-size setting register 91 (used for non-DMA waiting states): 32 words, The fourth refill-size setting register 94 (used for the memory-to-memory DMA waiting): 16 words, The third refill-size setting register 93 (used for the DMA waiting from the I/O devices to the memory): 8 words, and The second refill-size setting register 92 (used for the DMA waiting from the memory to the I/O devices) : 4 words.

In this case, the minimum size is set at 4 words, and the others are given by multiples of this value.

With this arrangement, even in a competitive state between the refill and data-transfer, reconciliation is carried out in a favorable manner. Here, it is possible to obtain better effects when the refill sizes are set in the descending order from the biggest as follows: the DMA waiting from the memory to memory, the DMA waiting from the I/O devices to the memory, and the DMA waiting from the memory to the I/O devices. The reasons for this are clearly indicated by the reasons for the settings of the order of preference that have been explained on the operations A through C with reference to FIG. 5.

Embodiment 7

The following description will discuss the other embodiment of the present invention.

Figure 8:
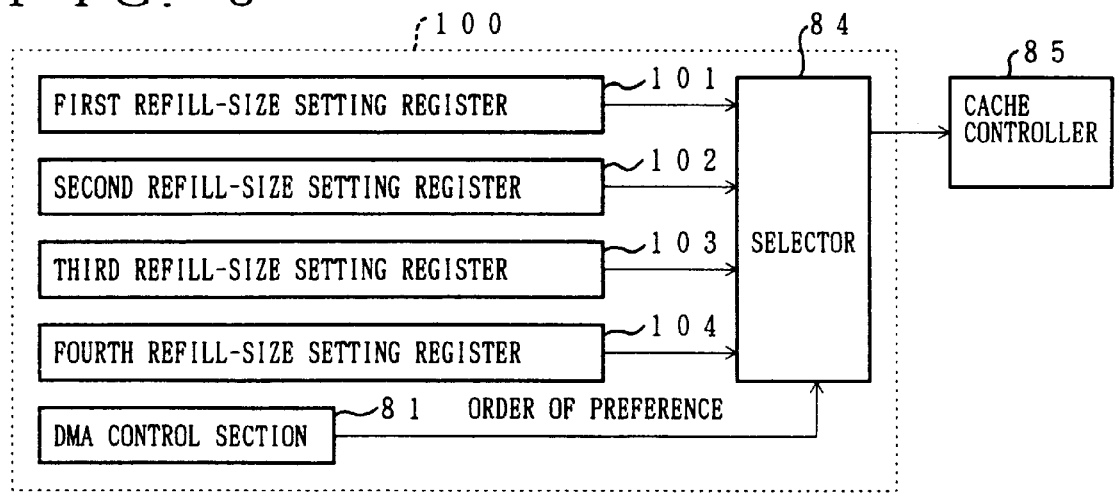
FIG. 8 is a block diagram showing a DMA controller of another embodiment of the present invention.

As illustrated in FIG. 8, the present DMA controller 100 is provided with first through fourth refill-size setting registers 101 through 104, and also provided with the DMA control section 81 and selector 84 in the same manner as the aforementioned DMA controller 80. In the present DMA controller 100, the first through fourth refill-size setting registers 101 through 104 and the selector 84 constitute a refill-size control means.

The first refill-size setting register 101 stores information for setting the refill size to a normal refill size, in the same manner as the aforementioned first refill-size setting register 82. The second through fourth refill-size setting registers 102 through 104, on the other hand, store information for setting the refill size to a size smaller than the refill size that is set by the information stored in the first refill-size setting register 101. These second through fourth refill-size setting registers 102 through 104 are used for the waiting process for any DMA operation. Therefore, in the present DMA controller 100 also, it is possible to eliminate the need for a big circuit size, and to prevent reduction in performance of the CPU 6, in the same manner as the aforementioned DMA controller 80.

Moreover, the second refill-size setting register 102 is used for the DMA waiting state of degree of preference 1, that is, the waiting process for the DMA operation of degree of preference 1; the third refill-size setting register 103 is used for the DMA waiting state of degree of preference 2; and the fourth refill-size setting register 104 is used for the DMA waiting state of degree of preference 3. Here, the numbers 1 through 3 of the degrees of preference represent the order of preference with respect to processes that are to be carried out upon receipt of a plurality of data-transfer requests at the same time, and number 1 represents the highest.

The selector 84 selects the first refill-size setting register 101 in cases other than the DMA waiting states, and in any of the DMA waiting states, it also selects any of the second through fourth refill-size setting registers 102 through 104, depending on the above-mentioned degree of preference of the data transfer related to the corresponding DMA waiting state. In other words, the selector 84 selects the second refill-size setting register 102 in the DMA waiting state of degree of preference 1, it selects the third refill-size setting register 103 in the DMA waiting state of degree of preference 2, and it selects the fourth refill-size setting register 104 in the DMA waiting state of degree of preference 3. The signal for indicating which degree of preference the corresponding DMA waiting state has is supplied from the DMA control section 81 to the selector 84.

Moreover, the refill sizes, indicated by the stored information in the second through fourth refill-size setting registers 102 through 104, are different from each other; the higher the degree of preference, the smaller the number. Therefore, the fourth refill-size setting register 104 has the biggest size, followed by the third refill-size setting register 103 and the second refill-size setting register 102 in this order.

With respect to the refill sizes specified by the stored information in the second through fourth refill-size setting registers 102 through 104, the DMA of degree of preference 1 is a DMA operation from the I/O devices to the memory, the DMA of degree of preference 2 is a DMA operation from the memory to the I/O devices, and the DMA of degree of preference 3 is a DMA operation from the memory 7 to the memory 7. The above-mentioned relationships are classified as follows:

The first refill-size setting register 101 (used for non-DMA waiting states), The second refill-size setting register 102 (degree of preference 1: used for the DMA waiting from the I/O devices to the memory), The third refill-size setting register 103 (degree of preference 2: used for the DMA waiting from the memory to the I/O devices), and The fourth refill-size setting register 104 (degree of preference 3: used for the memory-to-memory DMA waiting)

Refill sizes: Degree 1<Degree 2<Degree 3

With this arrangement, even in a competitive state between the refill and data-transfer, reconciliation is carried out in a favorable manner. Here, it is possible to obtain better effects when the refill sizes are set in the descending order from the biggest as follows: the DMA waiting from the memory to memory, the DMA waiting from the I/O devices to the memory, and the DMA waiting from the memory to the I/O devices. The reasons for this are clearly indicated by the reasons for the settings of the order of preference that have been explained on the operations A through C with reference to FIG. 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A DMA controller comprising:

a first register for storing a starting address of data transfer-destination;

a second register for storing a starting address of data transfer-origin;

a third register for storing the number of words of the data to be transferred;

a fourth register for storing information to determine whether the data transfer-destination is an I/O device or a memory;

a fifth register for storing information to determine whether the data transfer-origin is an I/O device or a memory;

a sixth register for storing the number of words to be transferred with respect to one transfer request in the case of data transfer between an I/O device and a memory; and an operation section which calculates addresses stored in the first and second registers and the number of remaining words of transferred data stored in the third register based on the information stored in the first register, second register, third register and sixth register, in response to a data transfer operation using a DMA process, so as to update the addresses and remaining words, wherein, in the case of memory-to-memory data transfer using the DMA process based upon the information stored in the fourth and fifth registers, one channel for carrying out the data transfer is provided, and in the case of data transfer between the I/O device and a memory using the DMA process, two channels for carrying out the data transfer are provided by using a circuit that constitutes said one channel.

2. The DMA controller as defined in claim 1, wherein the first register compatibly functions as a transfer-destination address register used for memory-to-memory data transfer and a transfer-destination address register used for data transfer between the memory and the I/O device.

3. The DMA controller as defined in claim 1, wherein the second register compatibly functions as a transfer-destination origin address register used for memory-to-memory data transfer and a transfer-destination origin address register used for data transfer between the memory and the I/O device.

4. The DMA controller as defined in claim 1, wherein:

the first register includes a transfer-destination address register used for memory-to-memory data transfer and a transfer-destination address register used for data transfer between the memory and the I/O device, and the second register includes a transfer-destination origin address register used for memory-to-memory data transfer and a transfer-destination origin address register used for data transfer between the memory and the I/O device.

5. The DMA controller as defined in claim 1, further comprising:

a storage means for storing the order of preference with respect to a plurality of data-transfer operations using the DMA process: and a reconciliation means for reconciling the data-transfer operations based on the order of preference stored in the storage means, wherein when, during a data-transfer operation using the DMA process, it receives a data-transfer request having a higher order of preference than the current data transfer, the reconciliation means suspends the on-going data-transfer operation, allows the operation means to update the stored information of the first register, the second register and the third register based on the number of transferred words up to the time of the suspension so that the suspended operation can become resumable, carries out the data-transfer operation having the higher order of preference, and resumes the previously suspended data-transfer operation upon completion of said data-transfer operation.

6. The DMA controller as defined in claim 5, wherein the order of preference is set so that data transfer from the memory to a printer that functions as the I/O device is carried out with the highest preference, so that data-transfer from a scanner that functions the I/O device to the memory is carried out with the second highest preference, and so that memory-to-memory data transfer is carried out with the lowest order of preference.

7. The DMA controller as defined in claim 1, wherein:

two pairs of input-terminals for DMA data-transfer request signals and output-terminals for DMA data-transfer response signals are provided; and one pair of the input-terminal for data-transfer request signals and the output-terminal for data-transfer response signals are used for the transfer from the memory to the I/O device; and the other pair of the input-terminal for data-transfer request signals and the output-terminal for data-transfer response signals are used for the transfer from the I/O device to the memory device.

8. A DMA controller, which controls DMA data transfer, comprising a cache controller that refills a cache and that is connected to the DMA controller, the refill-size control means being arranged so that, upon carrying out a DMA data-transfer operation, it makes the refill-size of the refill of the cache smaller than the size that has not been subjected to the data-transfer operation.

9. The DMA controller as defined in claim 8, wherein the refill-size control means is arranged so that, when a DMA data-transfer operation is carried out, the higher the order of preference of the data-transfer operation, the smaller the refill size of the refill of the cache, to prevent a loss of data.

10. The DMA controller as defined in claim 9, wherein the order of preference is set so that data transfer from the memory to a printer that functions as the I/O device is carried out with the highest preference, so that data-transfer from a scanner that functions the I/O device to the memory is carried out with the second highest preference, and so that memory-to-memory data transfer is carried out with the lowest order of preference.

11. The DMA controller as defined in claim 1, wherein:

the I/O device used for DMA transfer from the I/O device to the memory is an image-processing chip for converting multi-value images into binary images or quaternary images; and the I/O device used for DMA transfer from the memory to the I/O device is an image-processing chip for converting binary images or quaternary images to multi-value images.

12. The DMA controller as defined in claim 11, wherein: a scanner is connected to the image-processing chip for converting multi-value images into binary images or quaternary images; and a printer is connected to the image-processing chip for converting binary images or quaternary images to multi-value images.

13. A data processing apparatus which comprises a DMA controller for controlling memory-to-memory data transfer and data transfer that is carried out between an I/O device and a memory without using a CPU, the DMA controller comprising:

a first register for storing a starting address of data transfer-destination;

a second register for storing a starting address of data transfer-origin;

a third register for storing the number of words of the data to be transferred;

a fourth register for storing information to determine whether the data transfer-destination is an I/O device or a memory;

a fifth register for storing information to determine whether the data transfer-destination origin is an I/O device or a memory;

a sixth register for storing the number of words to be transferred with respect to one transfer request in the case of data transfer between an I/O device and a memory; and an operation section which calculates addresses stored in the first and second registers and the number of remaining words of transferred data stored in the third register based on the information stored in the first register, second register, third register and sixth register, in response to a data transfer operation using a DMA process, so as to update the addresses and remaining words, wherein, in the case of the DMA memory-to-memory data transfer based upon the information stored in the fourth and fifth registers, one channel for carrying out the data transfer is provided, and in the case of DMA data transfer between the I/O device and a memory, two channels for carrying out the data transfer are provided by using a circuit that constitutes said one channel.

14. The data-processing apparatus as defined in claim 13, wherein the first register compatibly functions as a transfer-destination address register used for memory-to-memory data transfer and a transfer-destination address register used for data transfer between the memory and the I/O device.

15. The data-processing apparatus as defined in claim 13, wherein the second register compatibly functions as a transfer-origin address register used for memory-to-memory data transfer and a transfer-origin address register used for data transfer between the memory and the I/O device.

16. The data-processing apparatus as defined in claim 13, wherein: the first register includes a transfer-destination destination address register used for memory-to-memory data transfer and a transfer-destination address register used for data transfer between the memory and the I/O device, and the second register includes a transfer-origin address register used for memory-to-memory data transfer and a transfer-origin address register used for data transfer between the memory and the I/O device.

17. The data-processing apparatus as defined in claim 13, further comprising:

a storage means for storing the order of preference with respect to a plurality of data-transfer operations using the DMA process: and a reconciliation means for reconciliating the data-transfer operations based on the order of preference stored in the storage means, wherein when, during a data-transfer operation using the DMA process, it receives a data-transfer request having a higher order of preference than the current data transfer, the reconciliation means suspends the on-going data-transfer operation, allows the operation means to update the stored information of the first register, the second register and the third register based on the number of transferred words up to the time of the suspension so that the suspended operation can become resumable, carries out the data-transfer operation having the higher order of preference, and resumes the previously suspended data-transfer operation upon completion of said data-transfer operation.

18. The data-processing apparatus as defined in claim 17, wherein the order of preference is set so that data transfer from the memory to a printer that functions as the I/O device is carried out with the highest preference, so that data-transfer from a scanner that functions the I/O device to the memory is carried out with the second highest preference, and so that memory-to-memory data transfer is carried out with the lowest order of preference.

19. A data processing apparatus which comprises a DMA controller for controlling, without using a CPU, memory-to-memory data transfer and data transfer that is carried out between an I/O device and a memory, the DMA controller comprising:

a cache controller that refills a cache and that is connected to the DMA controller, the refill-size control means being arranged so that, upon carrying out a DMA data-transfer operation, it makes the refill-size of the refill of the cache smaller than the size that has not been subjected to the data-transfer operation.

20. The data-processing apparatus as defined in claim 19, wherein the refill-size control means is arranged so that, when a DMA data-transfer operation is carried out, the higher the order of preference of the data-transfer operation, the smaller the refill size of the refill of the cache, to prevent a loss of data.

21. The data-processing apparatus as defined in claim 20, wherein the order of preference is set so that data transfer from the memory to a printer that functions as the I/O device is carried out with the highest preference, so that data-transfer from a scanner that functions the I/O device to the memory is carried out with the second highest preference, and so that memory-to-memory data transfer is carried out with the lowest order of preference.

* * * * *